May 28, 1963

A. PACE 3,091,388

CHANCE DEVICE FOR ENCOURAGING PUBLIC
SUPERVISION OF A CASH REGISTER

Filed July 28, 1961

INVENTOR.
ARTHUR PACE
BY
*Kirschstein, Kirschstein & Ottinger*
ATTORNEYS

May 28, 1963

A. PACE 3,091,388

CHANCE DEVICE FOR ENCOURAGING PUBLIC
SUPERVISION OF A CASH REGISTER

Filed July 28, 1961

INVENTOR.
ARTHUR PACE
BY
ATTORNEYS

May 28, 1963

A. PACE 3,091,388

CHANCE DEVICE FOR ENCOURAGING PUBLIC
SUPERVISION OF A CASH REGISTER

Filed July 28, 1961

INVENTOR.
ARTHUR PACE
BY
ATTORNEYS

United States Patent Office 3,091,388
Patented May 28, 1963

3,091,388
CHANCE DEVICE FOR ENCOURAGING PUBLIC SUPERVISION OF A CASH REGISTER
Arthur Pace, 1528 Drexel Ave., Miami Beach, Fla.
Filed July 28, 1961, Ser. No. 127,698
19 Claims. (Cl. 235—7)

This invention relates to a chance device for encouraging public supervision of a cash register.

Cash registers per se are provided with various checks and controls for guarding against pilferage. For example, it is usual for a cash register to be provided with a record tape on which there is duly imprinted the amount of each sale that is rung up, often with a symbol associated with a specific sales clerk, as well as a symbol indicating the type of merchandise that has been sold. However these checks and controls are predicated upon the operation of the cash register for each sale. The ringing up of the sale prints the various indicia on the tape, visibly displays to the customer a number in the amount of the sale and opens the cash drawer for the deposit of money and the making of change. However, if the sales person simply pockets the amount of the purchase without operating the cash register the checks and controls are vitiated. It is true that the public is accustomed to seeing a visible display of the amount of the sale on the cash register; nevertheless this display is so dull, trite and lacking in interest that it usually does not attract the customer's interest so that, unfortunately, sales clerks sometimes by-pass deposit of monies in the register and the ringing up of sales. This is particularly true under circumstances, for instance in bars and restaurants where the customer is not too observant and consumes the goods on the premises so that he does not want a cash register receipt.

It is an object of my present invention to provide a chance device which not only will attract the purchaser's attention to the cash register so as to incidentally draw his attention to the ringing up of the sale but will hold his attention for a period of time sufficient for him to notice the ringing up of the sale and which will also attract other people's attention as well so that if the purchaser should be uninterested, other members of the public will notice the operation of the chance device and consequently the operation of the cash register.

It is another object of my invention to provide a chance device of the character described which will stimulate sales, as by indicating rewards at random intervals, so that the customer's attention and that of his companion's will be retained for a period of time sufficient to observe the operation of the cash drawer.

It is recognized that the use of such a chance device in combination with a cash register can not prevent pilferage, as, for example, it can not prevent theft of money from the cash drawer. However this can be checked by means of the record tape. It simply is an object of my invention to provide an arrangement which will insure that the public is given a drawn out incentive to make sure that the cash drawer is opened each time that a sale is consummated; the remainder of the checkup is a function of the cash register and the psychological restraint on the sales clerk who is aware that his actions are under scrutiny.

Other objects of my invention in part will be obvious and in part will be pointed out hereinafter.

My invention accordingly consists in the features of construction, combinations of elements, and arrangements of parts which will be exemplified in the devices hereinafter described, and of which the scope of application will be indicated in the appended claims.

In the accompanying drawings, in which are shown various possible embodiments of my invention, FIG. 1 is a perspective view of my novel combination of a special chance device and associated cash register typically located on a counter in a retail establishment;

Figure 1:
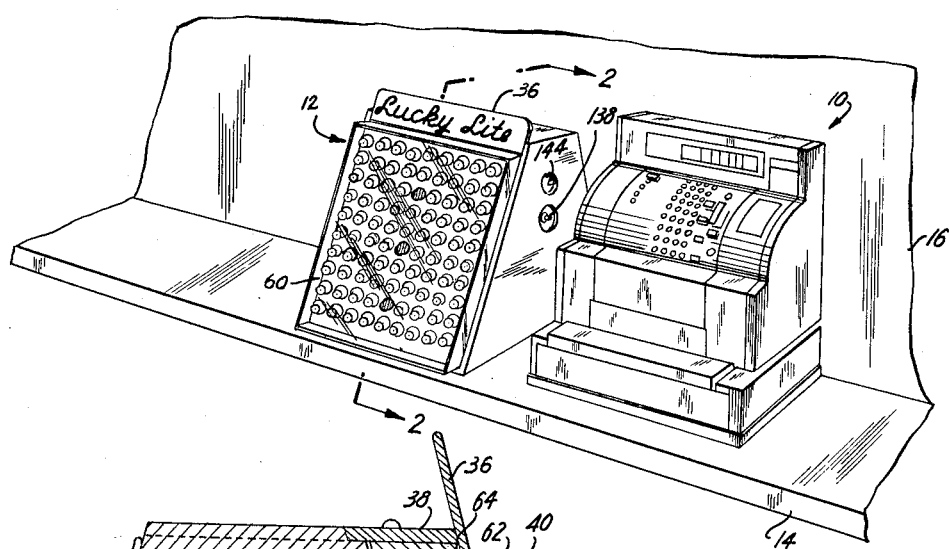

Referring now in detail to the drawings, and more particularly to FIGS. 1 through 6, the reference numeral 10 denotes a conventional cash register and the reference numeral 12, a chance device of a special type which in accordance with my invention is associated with the cash register in a manner soon to be described in detail.

The location of the cash register will be dictated by the requirements of the place of business. For example, in a store the cash register usually will be located on a counter, table or platform standing between the sales person and the public in which case the indicia displayed by the cash register each time that a sale is rung up is visible, inter alia, at the back of the register where it can be seen by the public. Alternatively, the cash register may be placed against a wall, the location being quite conventional in bars and restaurants, and in such instance the display of indicia each time that a sale if rung up is visible, inter alia, at the front of the register to both the sales person and to the public. In either event I place my chance device 12 alongside of or, if desirable, above the cash register so that it will be in the immediate physical vicinity of the cash register whereby its operation upon each sale will induce a visual inspection of the cash register so as to discourage pocketing of the amount of the sale.

As indicated earlier the chance device is, in accordance with my invention, one which is deliberately designed to attract attention both by awarding of prizes and by optical stimulus and moreover is one having a comparatively protracted operation, that is to say an operation that is not terminated in a moment but takes from ten to fifteen seconds for a cycle so that a patron will not overlook a lapse of operation of the chance device through failure of the sales person to ring up the sale on the cash register. In other words the chance device is designed to encourage attention to its operation so that its absence of operation will be missed and therefore there will be little likelihood that the clerk will fail to ring up the sale each time that one is consummated.

With the foergoing purposes in mind the chance device 10 includes an illuminated flickering optical display which is power operated independently of, although initiated by, opening of the cash drawer and which includes an energy storing device to prevent too short a period of operation.

Referring more specifically to the chance device 12, the same as shown herein is located on a shelf 14 protruding from a wall 16 of a room, the chance device being placed immediately alongside of the cash register 10.

The chance device includes a casing consisting of a bottom wall 18, a top wall 20, side walls 22, 24, a front wall 26 and a rear wall 28. The top, bottom and side walls can be made from any inexpensive material, wood being entirely satisfactory. The top wall may be parallel to the bottom wall, both these walls being horizontal, and the side walls are parallel to one another and are vertical. Optionally, the front and back walls may be upwardly and inwardly sloped (convergent) so that the side walls are in the shape of trapezoids with wide bottoms and narrow tops. It will be appreciated that the particular shape mentioned for the casing is not a critical feature of my invention.

The rear wall 28 conveniently constitutes a pair of doors 30, 32 (FIG. 5) secured as by hinges 34 to the rear edges of the side walls so as to provide ready access to the interior of the casing for maintenance and repair.

If desired, a rearwardly sloped advertising panel 36 may protrude upwardly from the front edge of the top wall the same being secured to a mounting strip 38 which is detachably fastened on the top wall.

In accordance with my invention and for the purpose of attracting a maximum of attention, the front wall is arranged to display a flickering bank 40 of electric lights. To this end the front wall 26 may be made of an electrically nonconductive material such for instance as wood or a synthetic plastic, e.g., Bakelite. Said wall is formed with a plurality of through openings 42 which preferably are arranged in some regular pattern. In the illustrated chance device I form ninety such openings 42 arranged in ten horizontal and nine vertical rows to define a rectangular grid. In each said opening I insert the threaded metal ferrule 44 of a small standard electric light bulb 46 the glass envelope 48 of which is located on the outer face of the front wall 26. The ferrules are a nice sliding fit in the openings so that the openings serve, in effect, as a means for holding the sundry light bulbs in predetermined relative positions, i.e., as physical, although electrically nonconductive, sockets.

Suitable means is included to supply electric energy to the sundry light bulbs 46. It will be understood that as is usual each light bulb has two terminals. One of these constitutes the threaded ferrule 44. The other terminal constitutes an electrically conductive contact tip 50 located at the center of the shank of the bulb and insulated in the customary manner from the threaded metal ferrule. Applied to the back of the front wall 26 and coextensive therewith is an electrically conductive panel 52, e.g., a copper sheet. The panel is held in any suitable manner to the front wall, as by staples or adhesive. Said sheet is formed with openings 54 in registry with the socket openings 42. The openings 54 are a very snug or even a push fit for the ferrules 44 or else include embryonic threads or tongues for engaging the screw threads of the ferrules. In either event an electric contact is effected between the metal electrically conductive panel 52 and all of the threaded ferrules 44. This constitutes a common electric connection for all of the light bulbs 46. Said light bulbs also include individual electric connections, these consisting of lead wires 56. There is a separate lead wire for each different light bulb and each lead wire is secured, as by soldering, to the central contact tip 50 of its associated light bulb.

Inasmuch as the glass envelopes 48 are comparatively fragile it is desirable to afford them some protection and for this, as well as for another optional purpose, I place a transparent cover 58 over the front wall 26 of the casing and over the bank 40 of lights. The cover may be made from any clear synthetic plastic, e.g., cellulose acetate butyrate, and comprises a sloping front wall 60 of rectangular shape with rearwardly extending flanges 62. Said flanges approximately match the contour of the periphery of the front wall and are formed with outwardly turned lips 64 that lie against the marginal zones of the front wall of the front face 26. Clamping strips 66 secured, as by brads or screws, to the side walls and to the top and bottom walls have protruding edges that engage the front surfaces of the lips 64 to maintain the cover in place.

In one form of my invention, to wit, that shown in FIG. 1, the great majority of the bulbs have envelopes of a single color, e.g., frosted white, and a few, for example, three, bulbs have envelopes of a different color, for instance, red. Thereby when the chance device is set into operation and the different bulbs are successively momentarily energized and when eventually but a single bulb remains constantly energized, if this single bulb is the odd colored, i.e., red, bulb, the customer thus is apprized that he has won an award.

Figure 7:
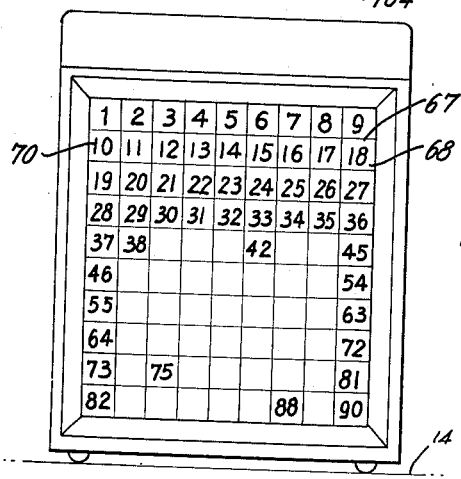
FIG. 7 is a front view of a modified form of chance device.

In an alternate form of my invention shown in FIG. 7 all of the bulbs are similarly colored and to indicate special, i.e., prize winning, bulbs the front wall 60 of the transparent cover 58 is subdivided, as by intersecting horizontal and vertical lines 67, into a series of contiguous areas 68, e.g., squares, each of which has imprinted therein a different indicia 70 so that ultimately when the chance device becomes quiescent only a single indicia will be illuminated. From day-to-day one or more indicia are selected as the ones to which awards are assigned so that the customer is prodded into paying close attention to the operation of the chance device and consequently to the operation of the cash register.

The chance device further includes a rotary driven selector switch 72 which is spun by power upon opening of the cash drawer, from which power is removed upon closing of the cash drawer so as to encourage its quick closure, and which has an angular momentum (energy) storing means to insure a protracted period of idling operation and thus retain the customer's attention.

Said selector switch 72 is driven by an electric motor 74 having an output shaft 76 connected by a reduction gear train 78 to a vertical selector shaft 80. The motor, the reduction gear train and the bearings for the selector shaft are housed in and supported by a metal casing 82 that is mounted on a horizontal partition 84 the edges of which are attached to the side walls 22, 24. The upper portion of the selector shaft 80 protrudes through an opening in the partition and has affixed thereto a selector arm 86. Desirably, the selector arm and the selector shaft are relatively heavy, for instance, in the order of a pound or more so that when they are set into rotation by the motor 74 they will store up a considerable amount of angular momentum. Thus when subsequently the motor is deenergized the selector arm will function as a stored energy inertia arm which will gradually dissipate its energy, and thus at first rapidly and then continually more slowly lose its angular velocity until finally it comes to rest by virtue of the friction in the motor, the friction in the gear train and the friction in the selector switch contacts soon to be described. It may be mentioned that to inhibit vibration the selector arm may be balanced as by increasing its weight at the short end 88 thereof remote from the selector switch contacts.

The selector arm has two switch contacts 90, 92 at its tip, the contact 90 being a commutator contact and the contact 92 being a selector contact.

The commutator contact 90 comprises a dependent resilient electrically conductive leaf spring, made for example of Phosphor bronze strip stock, the upper end thereof being secured to the selector arm 86, as by a nut and bolt 94. The lower end of the commutator contact is biased against a horizontal commutator ring 96 which is an annular flat strip of electrically conductive material secured to the upper face of the partition 84 in concentric relationship with the selector shaft 80. Accordingly when said shaft is spun the commutator contact 90 continually will ride on the ring and effect a constant electric engagement therewith.

The selector contact 92 likewise comprises an electrically conductive resilient leaf spring made, for instance, of Phosphor bronze and having one end secured to the selector arm 86 as by a nut and bolt 98. The two switch contacts 90, 92 are connected by an electrically conductive bridge plate 100.

The tip of the selector contact 92 is adapted to successively ride upon, i.e., engage one after another of, a circular series of spaced stationary contacts 102. Each of these latter comprises an electrically conductive vertical pin having its lower end imbedded in the partition 84. The pins are arranged in a circle with the selector shaft 80 at its center so that the selector contact 92 is able to sequentially engage the stationary contacts. The selector contact is flexed inwardly by the stationary contacts 102 so that it is in effect, spring loaded, i.e. biassed, outwardly whereby to engage the stationary contacts. Thus as soon as the rotating selector contact rides off any given stationary contact it will spring outwardly into engagement with the next stationary contact. Due to the friction between the commutator contact 90 and the commutator ring 96 the selector arm 86 will not reverse whereby the selector contact invariably will come to rest on only one stationary contact.

The lead wires 56 run to the stationary contacts 102. Said lead wires may be arranged to connect the light bulbs to the stationary contacts in an orderly manner as shown so that, for example, after the uppermost left hand light is energized the next succeeding light to the right in the top row will be lit, and then in succession the next lights in the top row will briefly glow followed by one after another of the lights in the second row, etc. However, I also have found it quite desirable to connect the lead wires 56 to the pins in such fashion that the light bulbs are not actuated in regular succession but rather, are momentarily lit at what appears to be random. Of course, such operation actually will not be at random but will be in a regularly repeating pattern; nevertheless, the pattern is an irregular one so that with a large number of light bulbs involved the customer will not notice the repetition of the cycle and will have his attention riveted to the flickering chance device until the last moment that it comes to rest with but a single (and possibly prize-awarding) bulb lit.

As indicated earlier the electric motor 74 is to be energized upon actuation of the cash register. Actuation of all cash registers invariably is followed by opening of the cash drawer and it is upon this movement that the operation of my chance device is dependent.

Figure 4:
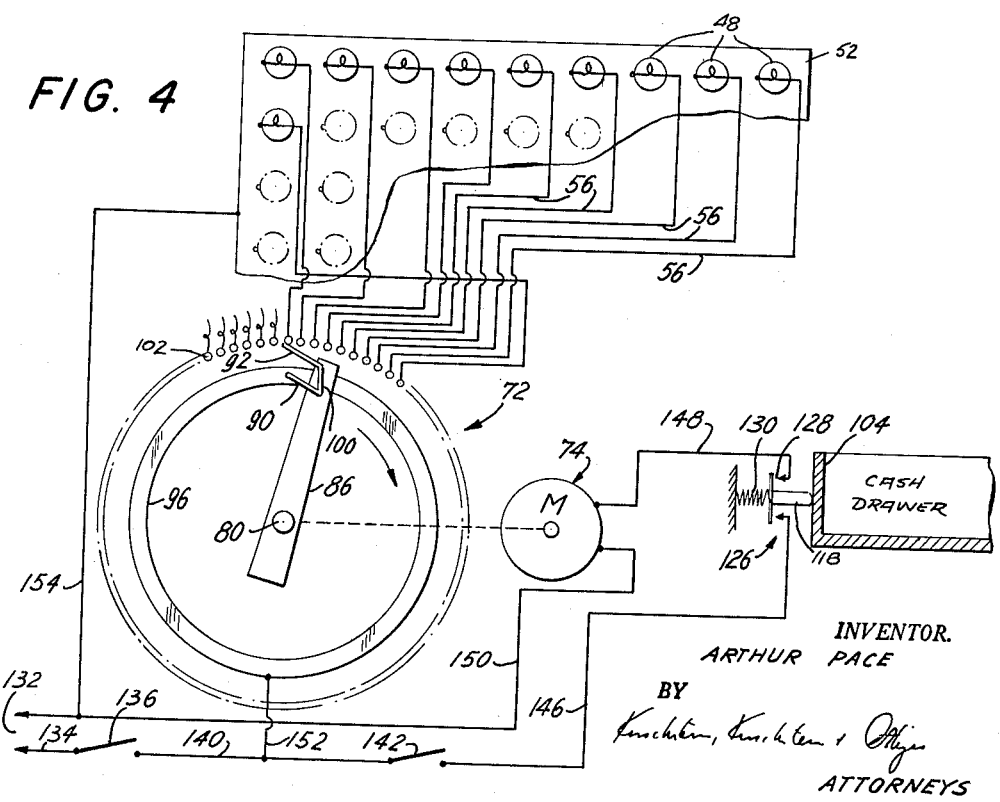
FIG. 4 is a schematic wiring diagram of the chance device and of the control switch therefor which is actuated by the cash register.
Figure 5:
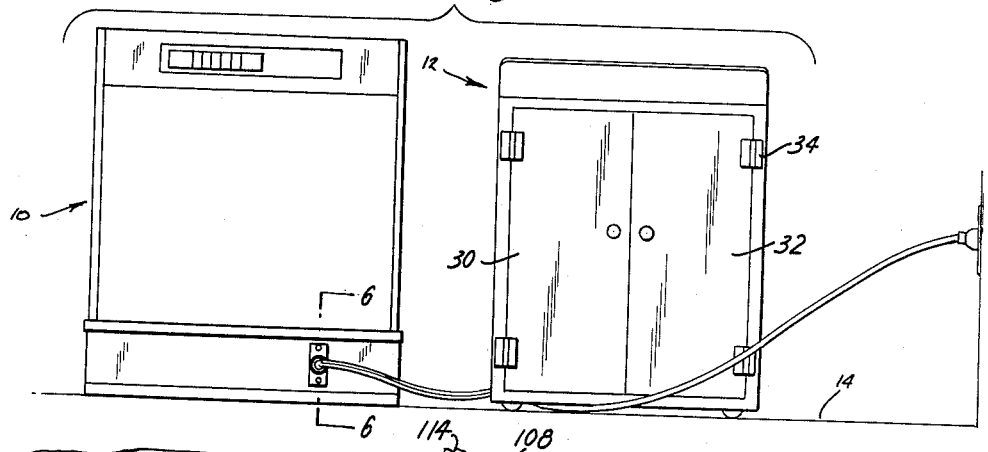
FIG. 5 is a rear view of the chance device and cash register.
Figure 6:
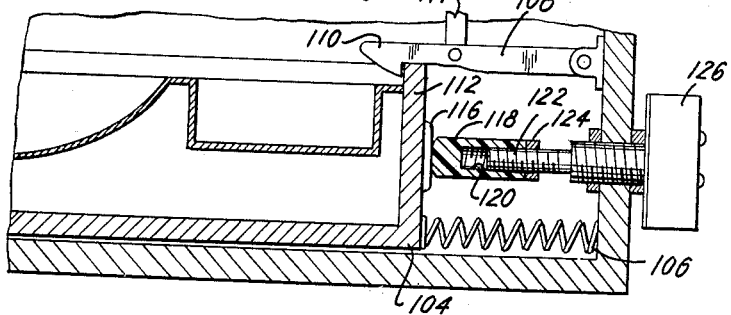
FIG. 6 is a fragmentary vertical sectional view of the rear of the cash drawer of the register and of the cash drawer controlled switch for the chance device.

More particularly, and referring to FIGS. 4 and 6, the cash register 10 has a cash drawer 104 which is mounted in the usual manner to slide horizontally with respect to the cash register casing from a fully retracted position as shown in FIGS. 1, 4 and 6 to an extended position in which the contents of the drawer are exposed. Conventional means such, for example, as a spring 106 is included to project the cash drawer when the register is actuated. The cash register also includes means to hold the drawer 104 in closed position the same constituting, for instance, a horizontal pawl 108 having a pendent tooth 110 which is positioned to engage the front face of the upper edge of the back wall 112 of the cash drawer. A suitable linkage system terminating at a rod 114 that is pivotally connected to the pawl 108 is energized upon actuation of the cash register to lift said rod, and therefore the pawl, and thereupon releases the cash drawer and permits it to be urged forwardly by the spring 106.

My novel combination includes means which senses the position of the cash drawer, and, more particularly, opening movement of said drawer and which upon the operation of such sensing means supplies power to the motor 74. Said sensing means quite simply comprises a strike plate 116 on the rear surface of the back wall 112 of the cash drawer. Cooperating with the strike plate is a feeler finger 118 having a rearwardly extending tapped bore 120 which is engaged by the tip of a threaded horizontal spindle 122. A lock nut 124 meshes with the spindle. Said spindle constitutes the actuating element of a momentary snap switch 126 the casing of which is physically secured to the back wall of the cash register.

The feeler finger is adjusted by backing off the lock nut 124, then turning the finger until it is the proper distance away from the back wall of the cash register and thereafter tightening the lock nut into frictional engagement with the rear edge of the feeler finger. The proper setting of the feeler finger is that in which it actuates the momentary switch with the cash drawer in its fully retracted position; however since the actuating element of a momentary switch preferably is not moved through any substantial distance it is desirable to adjust the feeler finger so that the strike plate engages the same only near the end of the rearward travel of the cash drawer. The momentary snap switch includes a pair of contacts 128 (see FIG. 4) which are biased to closed position as by a spring 130 schematically illustrated in FIG. 4 and which are opened by cooperation between the feeler finger and strike plate when the cash drawer is closed.

Figure 2:
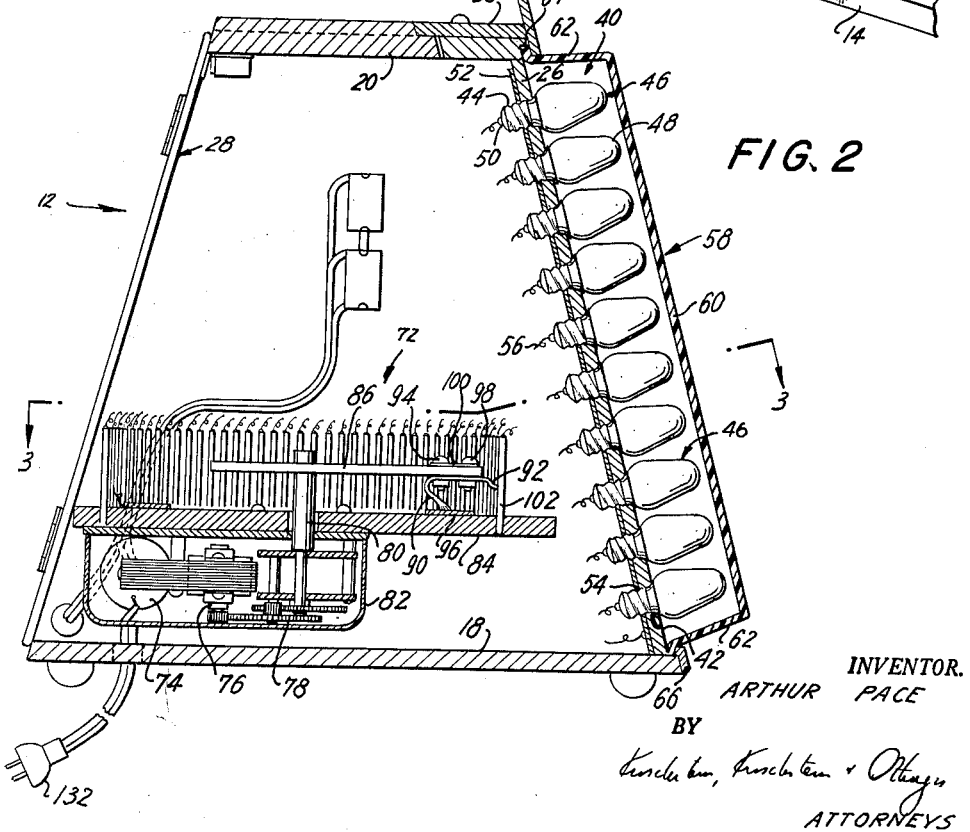
FIG. 2 is an enlarged sectional view taken substantially along the line 2—2 of FIG. 1 and constituting a front-to-back section through the chance device.
Figure 3:
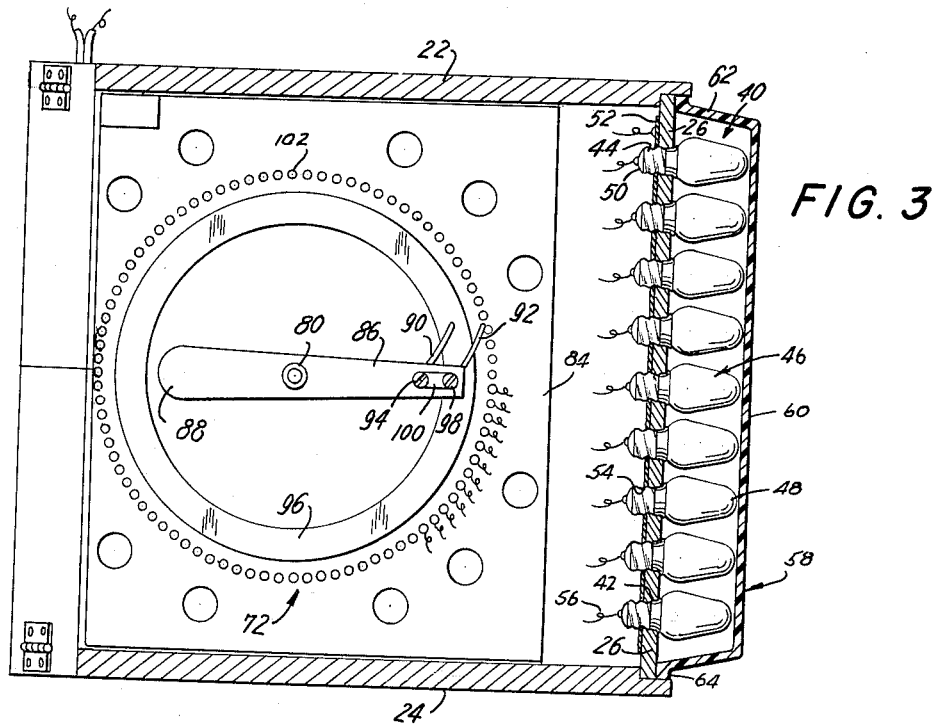
FIG. 3 is a sectional view taken substantially along the line 3—3 of FIG. 2.

The electric circuit for the chance device 10 and the cash drawer position sensing means is shown in FIG. 4, the physical location of some of the wiring therefor being illustrated in FIG. 2. It is to be understood that the wiring thus shown in FIG. 2 is simply a harness and is not indicative of the actual circuit denoted in FIG. 4.

The chance device and the sensing means conveniently draw their electric power from a wall outlet by means of a standard bayonet plug 132. A lead wire 134 connects one of the prongs of the plug to a manually operated master control switch 136 of the single pole single throw type. The actuating button 138 for the switch 136 is located in a side wall of the chance device. A lead wire 140 runs from the switch 136 to a manually actuatable auxiliary control switch 142 of the single pole single throw type. The actuating button 144 for the switch 142 likewise is located in a side wall of the chance device. It will be understood that both switches 136, 142 are not of the momentary type, that is to say when thrown to either open or closed position by hand they will remain in such position until oppositely actuated by hand. A lead wire 146 runs from the switch 142 to the momentary switch 126. A lead wire 148 runs from the momentary switch 126 to a terminal of the motor 74. Another lead wire 150 runs from the other terminal of the motor 74 to the other prong of the bayonet plug 132.

It now will be apparent that if the bayonet plug 132 is inserted in a wall outlet and if both switches 136, 142 are in closed position, and further that if the cash drawer is closed, the motor will be idle. It now the cash register is actuated, the cash drawer will open allowing the momentary switch 126 to close and supply electric energy to the motor 74. Said motor will spin as long as the cash drawer is open, and even after the cash drawer is closed will continue to spin for several seconds due to the stored angular momentum in the rotating selector arm and its adjuncts.

A lead wire 152 connects the lead wire 140, which is between the two switches 136, 142, to the commutator ring 96. Another lead wire 154 runs from the lead wire 150 to the electrically conductive panel 52 that is connected in common with the ferrules of all the light bulbs.

It will be appreciated that in this fashion I have provided what is in effect a stepping switch that when the shaft 80 is turned will successively supply electric current to one after another of the light bulbs. The path of the current is from one of the prongs of the bayonet plug through the lead wire 134, the closed master control switch 136, the lead wire 140, the lead wire 152, the commutator ring 156, the commutator contact 90, the bridge plate 100, the selector contact 92, the single one of the erect stationary contacts 102 then engaged by the selector contact 92, the associated lead wire 56, the associated light bulb 46, the electrically conductive panel 52, and finally through the lead wires 154, 150 back to the other prong of the bayonet plug.

Therefore when the motor is energized the light bulbs will be successively actuated for short periods of time which are sufficiently long to raise to incandescence the filaments thereof. In this fashion bulb after bulb in the display bank 40 will flicker off and on, the rate of the successive actuations being determined by the speed of the electric motor and the reduction ratio of the gear train which can be selected to give any desired effect. It may be mentioned that in FIG. 4 I have shown the bulbs connected so that successive bulbs in a row and successive rows are sequentially actuated as the selector switch swings around the circle of stationary contacts; but it is also noted in another form of my invention such a regular sequence of wiring is not employed so that the pattern of flickering illumination is apparently at random.

If it is desired to deactuate the chance device the master control switch 136 is opened; instead of being button controlled as illustrated this may be key controlled with the key in the possession of the owner. If it is simply desired to disengage the cash drawer position sensing means the switch 142 is opened. This too may be key controlled instead of being button controlled. Either of these switches desirably may be opened when the owner is on the premises and the cash register is being used so frequently as to prevent the chance device from coming to rest between the ringing up of successive sales. The switch 142 is opened when it is desired to keep lights lit in the chance device for advertising purposes and the switch 136 is opened when ever the energization of these lights is not desired.

It thus will be seen that I have provided a combination which achieves the several objects of my invention and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent,

1. In combination a cash register and an illuminated visual chance device, said cash register including a cash drawer and a means sensing position of said drawer, said chance device including a bank of electric lights, an unchecked rotary driven selector switch which stores an appreciable amount of angular momentum upon actuation thereof to continue idling rotation for several seconds after driving of said switch is stopped, an electric motor for driving said selector switch, circuit means for connecting said motor through said cash drawer position sensing means to a source of electric power so as to energize the motor upon opening of the cash drawer, and circuit means for successively momentarily connecting the sundry electric lights in the bank through the selector switch to said source of electric power so as to energize one light after another when the selector switch is rotated and so that when the motor is deenergized the selector switch will continue to turn for several seconds before coming to rest whereby the flickering of the lights and the prolonged flickering operation of the bank of lights will draw the public's attention to the opening of the cash drawer.

2. A combination as set forth in claim 1 wherein the rotary driven selector switch constitutes a heavy selector arm having a weight of at least one pound whereby to store up an appreciable amount of angular momentum when the same is rotated by the electric motor.

3. A combination as set forth in claim 1 wherein the electric means for successively momentarily connecting the lights in the bank through the selector switch to the source of power includes a commutator ring, a commutator contact on the selector switch and which rides on the commutator ring, a selector contact on the selector switch connected to the commutator contact, and a circle of spaced stationary contacts sequentially engaged by the selector contact and each individually connected to a different lamp.

4. A combination as set forth in claim 1 wherein the cash register is located in the immediate physical vicinity of the chance device.

5. A combination as set forth in claim 1 wherein the chance device includes a hollow casing and a horizontal partition carried within said casing and wherein the selector switch includes a vertical selector shaft carried by said casing, a horizontal selector arm mounted on the selector shaft, a selector contact at the tip of said arm, and a circle of stationary contacts having the vertical selector shaft at its center and sequentially engageable by the selector contact.

6. A combination as set forth in claim 5 wherein the electric motor is mounted on the lower surface of the partition and wherein a gear train is provided for driving the selector shaft from the electric motor.

7. A combination as set forth in claim 5 wherein a commutator ring is mounted on the upper surface of the partition concentric with the selector shaft and wherein a commutator contact is carried by the selector arm and rides on the commutator ring, said commutator contact being electrically connected to the selector contact.

8. A combination as set forth in claim 1 wherein the lights in the bank are arranged in a regular pattern in horizontal rows and vertical columns and wherein the selector switch when rotating sequentially energizes one light after another in regular order in the pattern.

9. A combination as set forth in claim 1 wherein the lights in the bank are arranged in a regular pattern in horizontal rows and vertical columns and wherein the selector switch when rotating sequentially energizes one light after another in irregular order in the pattern.

10. A combination as set forth in claim 1 wherein the means for sensing the position of the cash drawer includes a momentary electric switch having a feeler finger in the path of travel of the drawer and engaged by the drawer near the end of its movement into the cash register, and means to adjust the position of the feeler finger in a direction parallel to the direction of movement of the drawer.

11. A combination as set forth in claim 1 wherein the circuit means for connecting the motor to the cash drawer sensing means includes means for rendering such circuit means ineffective without affecting the circuit means for connecting the lights to the electric power.

12. A combination as set forth in claim 1 wherein the chance device includes a common panel for mounting the bank of electric lights, said panel comprising a wall of electrically nonconductive material to the back of which is applied a sheet of electrically conductive material, the lights of said bank having shanks, and said panel and sheet having pairs of registered openings therein for snugly receiving said shanks.

13. For use with a cash register having a cash drawer and means sensing position of said drawer, an illuminated visual chance device, said chance device including a bank of electric lights, an unchecked rotary driven selector switch which stores an appreciable amount of angular momentum upon actuation thereof to continue idling rotation for several seconds after driving of said switch is stopped, an electric motor for driving said selector switch, circuit means for connecting said motor through said cash drawer position sensing means to a source of electric power so as to energize the motor upon opening of the cash drawer, and circuit means for successively momentarily connecting the sundry electric lights in the bank through the selector switch to said source of electric power so as to energize one light after another when the selector switch is rotated and so that when the motor is deenergized the selector switch will continue to turn for several seconds before coming to rest whereby the flickering of the lights and the prolonged flickering operation of the bank of lights will draw the public's attention to the opening of the cash drawer.

14. A chance device as set forth in claim 13 wherein the rotary driven selector switch constitutes a heavy selector arm having a weight of at least one pound whereby to store up an appreciable amount of angular momentum when the same is rotated by the electric motor.

15. A chance device as set forth in claim 13 wherein the electric means for successively momentarily connecting the lights in the bank through the selector switch to the source of power includes a commutator ring, a commutator contact on the selector switch and which rides on the commutator ring, a selector contact on the selector switch connected to the commutator contact, and a circle of spaced stationary contacts sequentially engaged by the selector contact and each individually connected to a different lamp.

16. A chance device as set forth in claim 13 wherein the chance device includes a hollow casing and a horizontal partition carried within said casing and wherein the selector switch includes a vertical selector shaft carried by said casing, a horizontal selector arm mounted on the selector shaft, a selector contact at the tip of said arm, and a circle of stationary contacts having the vertical selector shaft at its center and sequentially engageable by the selector contact.

17. A chance device as set forth in claim 13 wherein the lights in the bank are arranged in a regular pattern in horizontal rows and vertical columns and wherein the selector switch when rotating sequentially energizes one light after another in regular order in the pattern.

18. A chance device as set forth in claim 13 wherein the lights in the bank are arranged in a regular pattern in horizontal rows and vertical columns and wherein the selector switch when rotating sequentially energizes one light after another in irregular order in the pattern.

19. In combination, a cash register and an illuminated visual chance device, said cash register including a cash drawer and a means sensing position of said drawer, said chance device including a group of different numbers and means to progressively momentarily illuminate one after another of the numbers in the group, said illuminating means comprising an unchecked rotary driven element which stores an appreciable amount of angular momentum upon actuation thereof to continue idling rotation for several seconds after driving of said element is stopped, an electric motor for driving said element, and circuit means for connecting said motor through said cash drawer position sensing means to a source of electric power so as to energize the motor upon opening of the cash drawer and de-energize it upon closing of the drawer so that when the drawer is opened and the motor is energized the numbers will be momentarily lit progressively one after another and when the drawer is closed and the motor is de-energized the element will continue to turn for several seconds before coming to rest, whereby the prolonged flickering of the illuminated lights will draw the public's attention to the opening of the cash drawer.

References Cited in the file of this patent
UNITED STATES PATENTS

| | | |
|---|---|---|
| 741,229 | Craney | Oct. 13, 1903 |
| 900,991 | Emeis | Oct. 13, 1908 |
| 978,635 | Page | Dec. 13, 1910 |
| 988,371 | Muzzy | Apr. 4, 1911 |
| 1,143,290 | Lippincott | June 15, 1915 |
| 2,175,892 | Green | Oct. 10, 1939 |
| 2,275,300 | Ladue | Mar. 3, 1942 |
| 2,333,002 | Goloboradko | Oct. 26, 1943 |